United States Patent
Carroll et al.

(10) Patent No.: US 10,524,082 B1
(45) Date of Patent: Dec. 31, 2019

(54) ACCELEROMETER-DRIVEN AUTOMATIC VOLUME AND TONE CONTROL

(71) Applicant: BOSE CORPORATION, Framingham, MA (US)

(72) Inventors: Grace Carroll, Boston, MA (US); Dale McElhone, Marlborough, MA (US); Christopher R. Paetsch, Cambridge, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 16/169,232

(22) Filed: Oct. 24, 2018

(51) Int. Cl.
| H04S 7/00 | (2006.01) |
| H04R 3/00 | (2006.01) |
| H04R 5/033 | (2006.01) |
| H04R 5/04 | (2006.01) |
| G01P 15/08 | (2006.01) |

(52) U.S. Cl.
CPC .............. H04S 7/307 (2013.01); G01P 15/08 (2013.01); H04R 3/002 (2013.01); H04R 5/033 (2013.01); H04R 5/04 (2013.01); *H04R 2430/01* (2013.01)

(58) Field of Classification Search
CPC ......... H04S 7/307; H04R 3/002; H04R 5/033; H04R 5/04; H04R 2430/01; G01P 15/08
USPC .................................................. 381/101–104
See application file for complete search history.

(56) References Cited

U.S. PATENT DOCUMENTS

| 7,190,292 B2* | 3/2007 | Bizjak | H03G 3/32 |
| | | | 341/110 |
| 8,588,430 B2* | 11/2013 | Tirry | H04M 1/72569 |
| | | | 381/101 |
| 10,375,506 B1* | 8/2019 | Moeller | H04R 5/033 |
| 2002/0085725 A1* | 7/2002 | Bizjak | H03G 3/3089 |
| | | | 381/106 |
| 2005/0126370 A1* | 6/2005 | Takai | A63B 24/0003 |
| | | | 84/636 |
| 2010/0303258 A1* | 12/2010 | Pan | G11B 27/10 |
| | | | 381/104 |
| 2014/0254817 A1* | 9/2014 | Vilermo | H04R 1/32 |
| | | | 381/74 |
| 2018/0308467 A1* | 10/2018 | Yamkovoy | G10K 11/178 |

* cited by examiner

*Primary Examiner* — David L Ton
(74) *Attorney, Agent, or Firm* — Patterson + Sheridan, LLP

(57) ABSTRACT

Methods and apparatus are provided for automatically adjusting, by an audio device, the SPL of its audio output. As described herein, the SPL is adjusted based on approximated noise in an ear canal of occluded ears as determined by an accelerometer measuring the user's motion. According to aspects, the audio device adjusts a tone of the signal by adjusting the SPL of a set of frequencies and also adjusts the overall gain of the full frequency spectrum of the audio signal. The tone may be adjusted more quickly as compared to the overall broadband gain.

21 Claims, 4 Drawing Sheets

ACCELEROMETER-DRIVEN AUTOMATIC VOLUME AND TONE CONTROL

FIELD

Aspects of the disclosure generally relate to automatically adjusting the sound pressure level (SPL) output by an audio device based on the motion measured in-ear.

BACKGROUND

Audio devices are worn by users engaging in a variety of activities including relatively stationary and high-impact activities. Noise in an ear canal may vary based, at least in part, on the rate at which a user's feet strike the ground. A user may compensate for in-ear noise by manually adjusting the volume of the audio device. Audio devices that allow a user to more easily hear acoustic output while participating in different types activities are desirable.

SUMMARY

All examples and features mentioned herein can be combined in any technically possible manner.

Aspects provide methods and apparatus for automatically controlling, by an audio device, an SPL of an audio output based on measured motion. According to aspects, the motion is measured by an accelerometer located on an earpiece of a wearable audio device. According to aspects, the motion is measured by a device external to and in communication with the wearable audio device. In an example, a cellular phone measures the motion of the user and communicates an indication of the motion to the audio device. In response, the audio device adjusts the SPL of the audio output. As described herein, an accelerometer measures motion, and the motion is used to approximate sound as a function of frequency in an ear canal. The audio device automatically adjusts one or more of the volume (broadband gain) or the tone of the audio output based on the approximated noise in the ear canal estimated by an accelerometer signal.

In an aspect, a method performed by a wearable audio device is provided. The method includes outputting an audio signal, measuring, by an accelerometer, motion in an ear canal of a user of the audio device, automatically adjusting a sound pressure level (SPL) of audio signal based, at least in part on the measured motion, and outputting the adjusted audio signal.

In an aspect, automatically adjusting the SPL of the audio signal comprises adjusting the SPL across all frequency bands of the audio signal by a same amount.

In an aspect, automatically adjusting the SPL of the audio signal comprises adjusting the SPL for at least one frequency band by a first amount. In an aspect, automatically adjusting the SPL of the audio signal further comprises adjusting the SPL across all frequency bands of the audio signal by a second amount.

In an aspect, the method further comprises processing a first frequency band of the audio signal occupying a lower frequency portion of the audio signal and processing all frequency bands of the audio signal including the first frequency band, wherein automatically adjusting the SPL comprises adjusting the SPL more for the first frequency band as compared to all frequency bands of the audio signal. In an aspect, automatically adjusting the SPL further comprises adjusting the SPL across all frequencies of the first frequency band and the audio signal. In an example, the first frequency band comprises frequencies less than or equal to 100 Hertz. In an example, automatically adjusting the SPL comprises one of increasing or decreasing the SPL of the audio signal.

Aspects provide a wearable audio device comprising a speaker configured to output an audio signal, an accelerometer configured to measure motion in an ear canal of a user of the audio device, and a processor configured to automatically adjust a sound pressure level (SPL) of audio signal based, at least in part on the measured motion, wherein the speaker is configured to output the adjusted audio signal.

In an aspect, the wearable audio device further comprises circuitry configured to separate the audio signal into a first frequency band and a second frequency band, wherein the first frequency band occupies lower frequency portions of the audio signal as compared to the second frequency band, wherein the processor is configured to adjust a tone of the audio signal by adjusting an SPL of the first frequency band more than an SPL of the second frequency band.

According to aspects, the processor is further configured to adjust the SPL across all frequencies of the audio signal. According to aspects, the processor is configured to automatically adjust the SPL of the audio signal by adjusting the SPL across all frequency bands of the audio signal by a same amount. According to aspects, the adjusting comprises increasing the SPL across all frequency bands of the audio signal.

According to aspects, measuring the motion in the ear canal provides an estimate of the sound as a function of frequency when the wearable audio device is placed in the ear canal of the user.

According to aspects, the device comprises a microphone configured to detect sound occupying different frequency bands than the estimate of the sound as the function of frequency. The processor is configured to automatically adjust the SPL of the audio signal based, at least in part on the measured motion and the sound detected by the microphone.

According to aspects, the wearable audio device comprises a flexible outer surface configured to contact and create a gentle seal with the ear canal of the user.

Aspects provide a method performed by a wearable audio device comprising outputting an audio signal having a first sound pressure level (SPL), measuring, by an accelerometer, motion in an ear canal of a user of the audio device, automatically increasing the SPL of the audio signal based, at least in part on the measured motion to generate an audio signal having a second SPL, outputting the audio signal having the second SPL, measuring, by the accelerometer, a decrease in the motion in the ear canal of the user, automatically decreasing the SPL of the audio signal having the second SPL based, at least in part, on the decrease in the motion in the ear canal to generate an audio signal having a third SPL, and outputting the audio signal having the third SPL.

In an aspect, the motion in the ear canal varies based, at least in part, on a rate at which a user's feet contact the ground.

In an aspect, automatically increasing the first SPL of the audio signal based, at least in part on the measured motion to generate the audio signal having the second SPL comprises increasing the first SPL for at least one frequency band by a first amount and increasing the first SPL across all frequency bands of the audio signal by a second amount.

In an aspect, automatically increasing the SPL of the audio signal comprises increasing the SPL across all frequency bands of the audio signal by a same amount.

In an aspect, automatically increasing the SPL of the audio signal comprises increasing the SPL based on a frequency band of the audio signal.

DETAILED DESCRIPTION

Wearable audio devices configured to contact and create a gentle seal with the user's ear canal are worn by users as they partake in different activities. In an example, a user wears an in-ear audio device as he sits in a waiting room, walks in a park, goes for a run, and lays down to relax post-run. Due to the occlusion of the ear canal caused by the audio device placed in-ear, the user experiences an increase in internal sound in the ear canal because sounds may not escape through normal airflow to the outside world.

Figure 1:
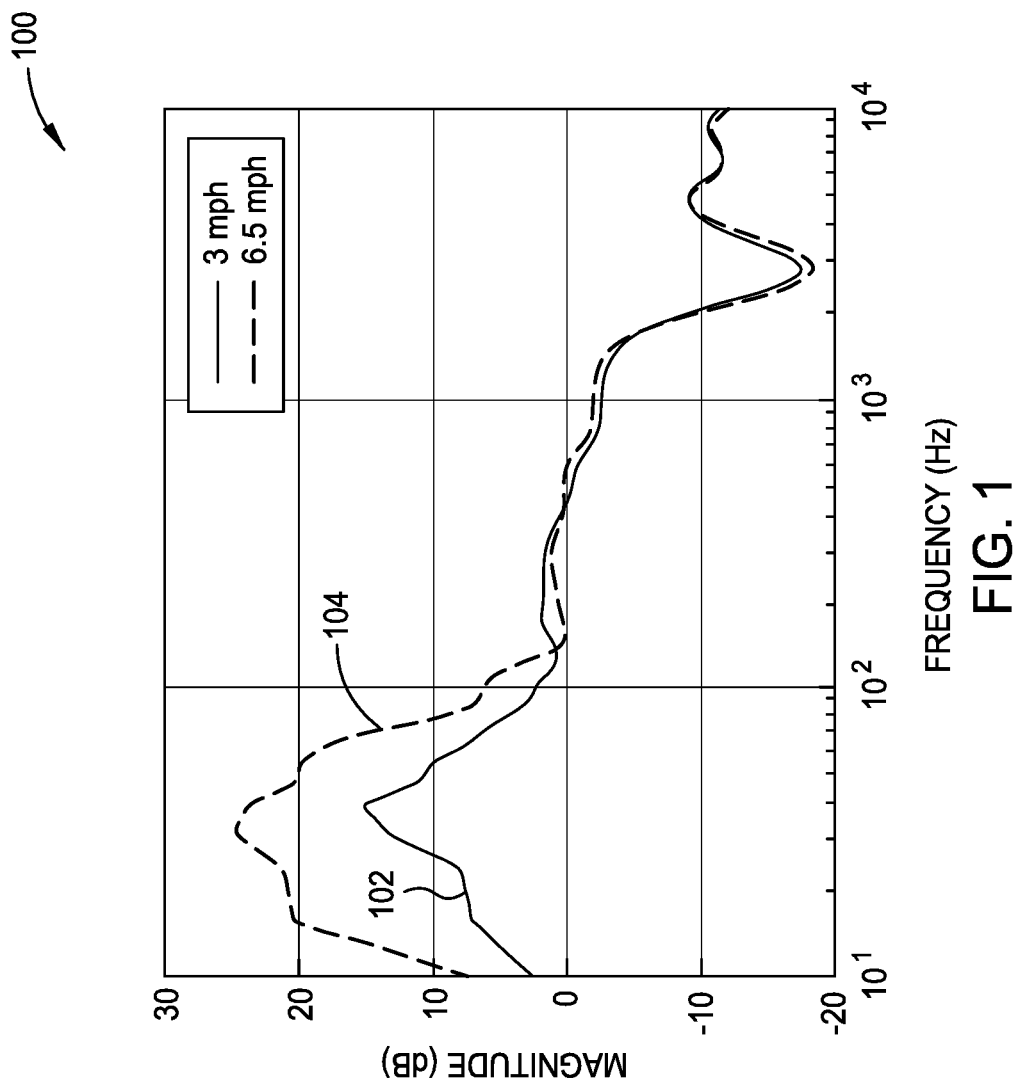
FIG. 1 illustrates the average sound in an occluded ear canal as users move at different speeds.

FIG. 1 illustrates an example 100 passive insertion gain in decibels (dBs) of in-ear noise measured for a set of users walking and running while wearing in-ear headphones (earbuds), normalized by the open-ear noise measured for the same users walking and running. An in-ear microphone measured sound in-ear of users as they move at 3 miles per hour (MPH) and 6.5 MPH, both with and without earbuds. Line 102 illustrates the average amplification in the ear canal as the set of users walk at 3 MPH with earbuds inserted. Line 104 illustrates the average amplification in the ear canal as the set of users run at 6.5 MPH with earbuds inserted. FIG. 1 illustrates that sound within the ear canal increases as user's run. Thus, as feet strike the ground at an increased rate, a user experiences an increase in sound within the ear canal.

As shown by lines 102 and 104, regardless of speed, more noise is measured in the ear canal at lower frequencies when the ear is occluded as compared to higher frequencies. Earbuds may be more effective in attenuating outside noise at higher frequencies and less effective in attenuating outside noise at lower frequencies. Additionally, low frequency sounds that may typically leave the ear canal may be trapped due to the occluded ear canal.

Referring to the example scenario provided above, a user may be listening to audio output via an in-ear audio device. The user may be sitting in a waiting room and may have the music adjusted to a comfortable volume. When the user moves from sitting to walking in a park, he experiences an increase in noise in his ear canals. The user's feet hitting the ground as he walks may become louder compared to the audio output of the audio device. Therefore, he may increase the volume of his music to comfortably hear the music as he walks.

As the user moves more quickly and begins to run, the noise inside his ear canals continues to increase. The sound of the user's feet hitting the ground as he runs may become louder in the user's ear canals. In response, user may again increase the volume of his music so that he may comfortably hear the music while running.

After completion of his run, the user may lay down. The music may be too loud in part because the noise in the user's ear canal has decreased. Therefore, the user may decrease the volume to compensate for the decrease in noise in the user's ear canals. In an effort to decrease or avoid these manual volume adjustments and create a more seamless listening experience regardless of changing user speed and in-ear sound levels, automatic SPL adjustment based on accelerometer measurements are provided herein.

Aspects of the present disclosure provide methods and apparatus configured to automatically adjust audio output by increasing or decreasing an SPL of the audio based on motion measurements obtained via an accelerometer. The accelerometer measures motion or vibration across a range of frequencies. The accelerometer measurements are used to infer or approximate sound in the ear canal as a function of frequency. The detected motion is used to approximate sound in an ear canal. The audio device is configured to adjust SPL of audio output based on approximated sound in the ear canal as determined by the accelerometer signal.

As shown in FIG. 1, the sound within a user's ear canal increases as the user moves more quickly. As the motion increases, the audio device increases the SPL of the audio output. As shown in FIG. 1, the sound within the user's ear canal decreases when the user slows down. Therefore, as the motion decreases, the audio device decreases the SPL of the audio output.

Additionally, based on the plots shown in FIG. 1, more noise is measured in the ear canal at lower frequencies when the ear is occluded as compared to higher frequencies. A user's feet strike the ground more heavily as he moves from walking, to jogging, to running. The automatic SPL control based on motion detected by an accelerometer compensates for the increased noise in the ear canal caused by the user's footfalls. A footfall may be associated with a certain bass frequency or range of bass frequencies. When the accelerometer detects motion, caused by the noise in the ear canal, at the target frequency or range of frequencies, the audio device automatically adjusts the audio signal output. Adjusting the signal comprises increasing or decreasing an overall SPL and/or adjusting the tone of the audio signal by increasing or decreasing the SPL for a set of frequency bands of the audio signal. In an aspect, a footfall is associated with energy in the ear canal centered at approximately 40 Hz. Thus, in an example, tone of the audio signal is adjusted by low pass (LP) filtering the audio signal to isolate bass band frequencies and adjusting the SPL of the bass band frequencies. In an example, frequencies lower than 100 HZ are isolated by the LP filter.

According to an aspect, and as will be described in more detail with reference to FIG. 4, the audio device applies two-band equalization, wherein a variable gain is applied to adjust a tone of the audio signal and an overall gain is applied all frequency bands of the audio signal. The two-band equalization compensates for the increased sound in the lower frequencies, such as those caused by footfalls. In an example, the bass frequencies are adjusted virtually instantaneously within milliseconds of detecting the footfall and the overall gain is applied at a slower time constant, such as over one second.

Figure 2:
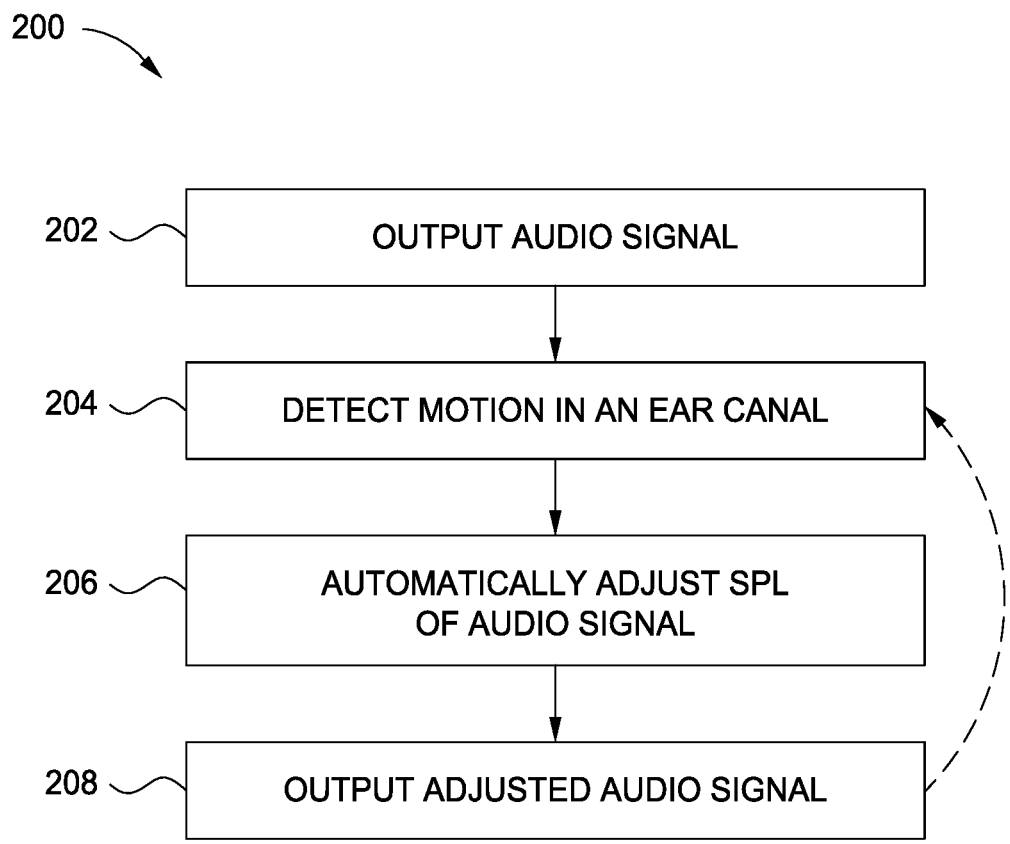
FIG. 2 illustrates example operations for automatically adjusting an output of an audio device based on an accelerometer signal.

FIG. 2 illustrates example operations 200 performed by an audio device for automatically adjusting the SPL of an audio signal based on detected motion.

At 202, the audio device outputs an audio signal.

At 204, the audio device determines motion of a user of the audio device. In an aspect, an accelerometer measures the user's motion. The accelerometer may be located on or off of the audio device. In an example, the accelerometer is disposed on the wearable audio device, such as on an ear tip that is inserted into the user's ear. In an aspect, a wireless device on the user measures the user's acceleration and wirelessly transmits the information indicative of the acceleration to the audio device.

At 206, the audio device automatically adjusts an SPL of audio signal based, at least in part on the determined motion. According to aspects, the audio device adjusts the overall gain applied to the audio signal by adjusting the SPL across all frequency bands of the audio signal.

According to aspects, the audio device adjusts the tone of the audio signal by adjusting the SPL of the audio signal based on a frequency band. Adjusting the tone refers to adjusting the SPL for a set of frequencies of the audio signal. As shown in FIG. 1, more noise is measured in the ear canal at lower frequencies when the ear is occluded as compared to higher frequencies. Accordingly, the audio device may adjust bass frequencies more than higher frequency bands of the audio signal.

According to aspects, the audio device adjusts the overall gain and the tone in a two-band equalization in response to measured acceleration. A broadband gain is applied to all frequencies of the audio signal and a bandpass (BP) filter is applied to the accelerometer signal to mimic the increase in noise the user experiences as a result of increase in speed. A low pass (LP) filter filters low frequency portions of the audio signal that are modulated by smoothed versions of the BP accelerometer signals. The audio device is configured to processes all frequency bands of the entire audio signal by applying a gain and modulate the gain by smoothed versions of the BP accelerometer signal.

The SPL adjustment for low frequency portions or bands of the audio signal occurs more quickly than the overall SPL adjustment. In an example, a low frequency band of the audio signal is adjusted by a greater amount as compared to the entire audio signal.

Figure 3:
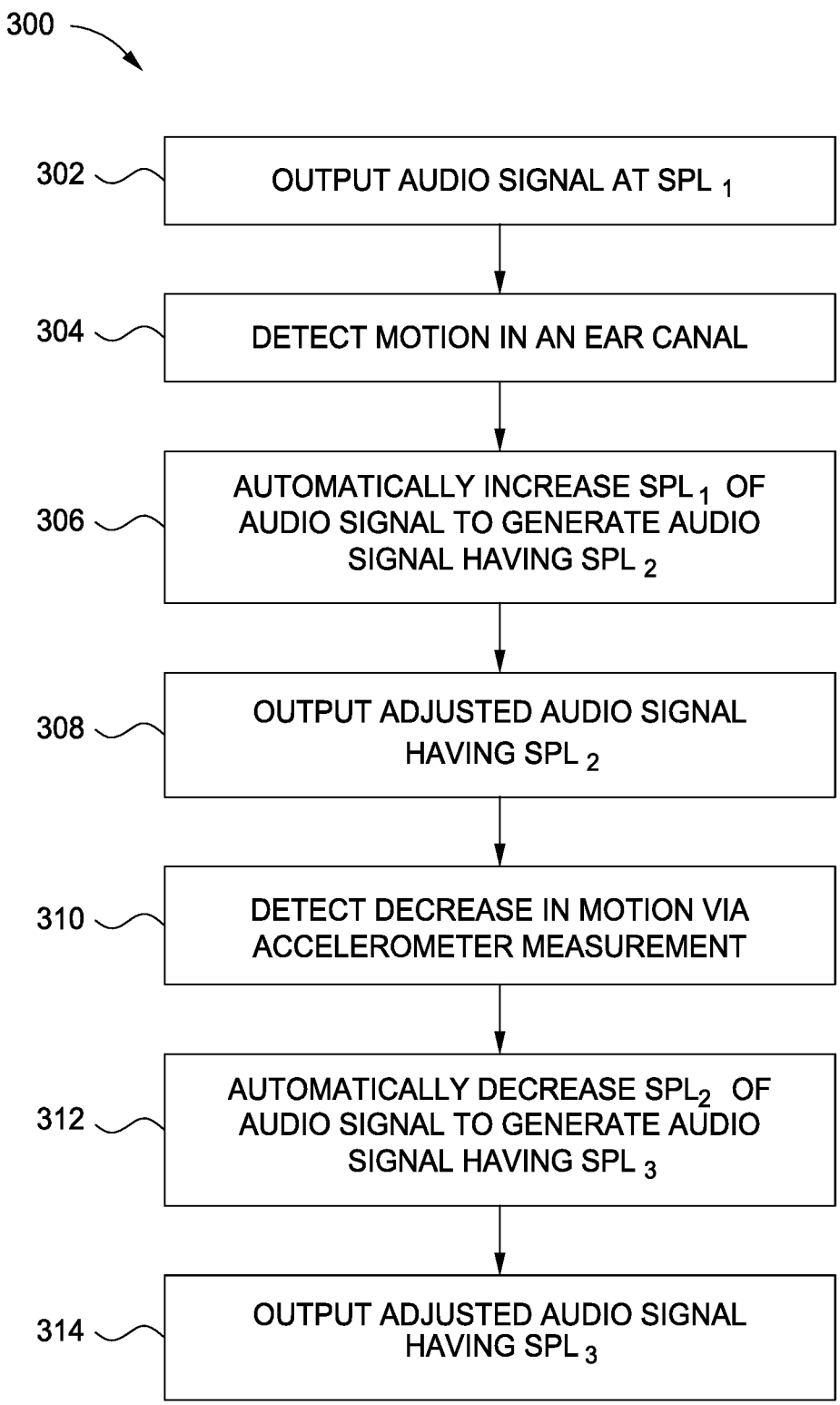
FIG. 3 illustrates example operations for automatically and iteratively adjusting the SPL of an audio signal.

At 208, the audio device outputs the adjusted audio signal. The signal is adjusted to compensate for noise in-ear as observed by a change in the user's speed. According to aspects, after outputting the adjusted audio signal, the audio device continues to step 204 to detect motion in the ear canal to continuously adjust the audio output based on the detected motion. FIG. 3 provides one specific example of iteratively adjusting the SPL of the audio signal.

FIG. 3 illustrates example operations 300 performed by an audio device to automatically and iteratively adjust the SPL of an audio signal.

At 302, the audio device outputs an audio signal having a first SPL.

At 304, the audio device measures, by an accelerometer, an increase in motion in an ear canal of a user of the wearable device. As described above, in one example, the accelerometer may be located external to the audio device. The accelerometer signal may be wirelessly communicated to the audio device by the external device.

At 306, the audio device automatically increases the SPL of the audio signal based, at least in part, on the determined increased motion to generate an audio signal having a second SPL. At 308, the audio device outputs the audio signal having the second SPL.

At 310, the audio device measures, by the accelerometer, a decrease in the motion in the ear canal of the user. At 312, the audio device automatically decreases the SPL of the audio signal having the second SPL based, at least in part, on the decrease in the motion in the ear canal to generate an audio signal having a third SPL.

At 314, the audio device outputs the audio signal having the third SPL.

Figure 4:
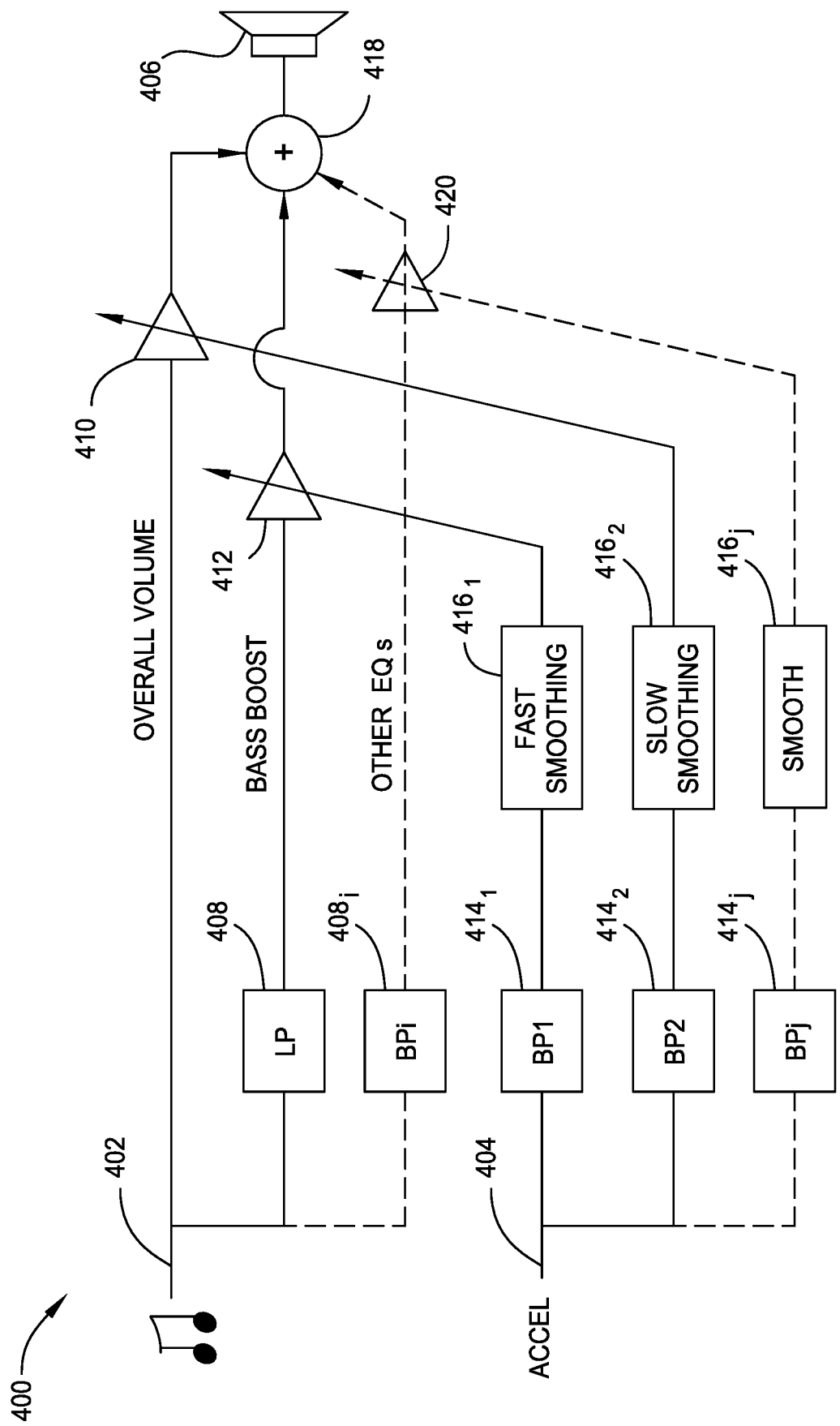
FIG. 4 illustrates an example of automatically adjusting the SPL of the audio signal.

The adjustment of the audio signal may be performed as illustrated in FIG. 4. FIG. 4 illustrates an example 400 of automatically adjusting the SPL of the audio signal. The system has an audio signal 402 input and an accelerometer signal 404 input and outputs a summed, gained, and bass boosted version of the audio signal.

The solid signal paths illustrate two-band equalization in response to acceleration. The two-band equalization includes an overall volume boost and a bass boost. As used herein, equalization may refer to tone control of the audio signal.

The first path, which may be called the volume path, comprises all frequency bands of the audio signal 402. The second path comprises low frequency components of the audio signal. In the second path, a LP filter 408 filters out the high frequency components of the audio signal and allows the low, bass frequency components of the audio signal to pass.

An amplifier 410 applies a gain to the audio signal in the volume path and an amplifier 412 applies a gain to the bass frequencies of the audio signal. The magnitude of the gain and bass boost are both in response to the magnitude of the measured acceleration. The gains of the first and second paths are modulated by smoothed versions of band-passed (BP) accelerometer signals.

BP filters $414_1$-$414_2$ isolate frequency ranges of the accelerometer signal that may be used to modulate the gains in the audio signal paths described above. In an example, BP filters $414_1$-$414_2$ are tuned to pass frequencies from the accelerometer signal that correspond to a user's foot hitting the ground or a surface. The smoothing blocks $416_1$-$416_2$ are configured to keep the gain being applied by the respective amplifier 412 and 410 from changing too quickly. In an example, the bass smoothing block $416_1$ is set to be responsive within tens of milliseconds of detecting a footfall and the overall gain smoothing block $416_2$ is set to be slower, responding on the order of one second.

A combiner 418 sums the output of the amplifiers 410 and 412 to generate the adjusted audio output to be output by a speaker 406 of the in-ear audio device.

According to aspects, instead of dual-band equalization, additional equalization paths adjust the tone in other frequency ranges, such as mid or high frequency ranges. Dashed lines illustrate multi-band equalization in accordance with aspects of the present disclosure. In an example, an additional BP filter $408_i$ isolates frequency bands of interest from the audio signal 402. The frequency bands may have a higher frequency than the bass bands output by the LP filter 408. In one example, and based on the data shown in FIG. 1, the tone of the audio signal is adjusted by adjusting the SPL more for the bass bands than the higher frequency components isolated by BP filter $408_i$.

The gain applied to the additional equalization paths are modulated by smoothed versions of a BP accelerometer signal as described above. The outputs of the amplifiers 410, 412, and 420 are summed by the combiner 418 to generate the adjusted audio output.

The addition of $BP_i$ $408_i$, to the existing LP filter 408 to isolate bass frequencies introduces a second equalization band. According to aspects, with more than one equalization band, the first, pure volume path is filtered with a high pass (HP) filter or may be completely removed. Additionally, audio bands from $BP_j$ $414_j$ may pass other frequencies in the accelerometer signal or, in some aspects, in a microphone signal. Wind noise includes higher frequency content than footfalls. Wind noise may not be picked up and measured with an accelerometer; however, signal from a microphone may measure wind noise. Thus, in an example, a microphone on the audio device is configured to detect sound that occupies different frequency bands than the sound in the ear canal inferred by in-ear accelerometer motion measurements. The audio signal is adjusted based on the inferred sound in the ear canal as well as the noise detected by the microphone (such as wind noise). In this example, a high frequency BP filter or HP filter may replace $BP_i$ 408$_i$ in the audio path and its gain would be fed by a smoothed band-pass ($BP_j$ 414$_j$) filtered microphone signal output by the smoothing block 416$_j$.

According to aspects, the in-ear audio device configured to automatically adjust the volume and tone of an audio signal based on an accelerometer signal may include an accelerometer, memory and processor, an optional communication unit, transceiver, and audio output transducer or speaker. The memory may include Read Only Memory (ROM), a Random Access Memory (RAM), and/or a flash ROM. The memory stores program code for controlling the memory and processor.

The processor controls the general operation of the audio device. For example, the processor performs process and control for audio and/or data communication. In addition to the general operation, the processor is configured to automatically adjust the volume and/or tone of output by the audio device based on the accelerometer signal as described herein. By adjusting the volume and/or the tone based on the accelerometer signal, the audio output by the audio device is automatically adjusted based on approximated noise (estimated via motion of the accelerometer) in the ear canal. Additionally, the automatic audio adjustment provides a desirable, seamless listening experience for the user regardless of their physical activity. Accordingly, absent user interaction, the user may comfortably hear the audio output as a level of in-ear noise varies.

According to aspects, the accelerometer measures acceleration in three axes. Based on the detected acceleration in the x, y, and z axis, the audio device may intelligently determine how to adjust the audio output. For example, when the accelerometer detects vertical acceleration and not horizontal acceleration, the user may be on a treadmill. Accordingly, SPL adjustment for wind noise may not be necessary and the audio device may disable the BP filters associated with this frequency band.

The optional communication unit facilitates a wireless connection with one or more other wireless devices. For example, the communication unit may include one or more wireless protocol engines such as a Bluetooth engine. While Bluetooth is used as an example protocol, other communication protocols may also be used. Some examples include Bluetooth Low Energy (BLE), Near Field Communications (NFC), IEEE 802.11, or other local area network (LAN) or personal area network (PAN) protocols. The communication unit may, in conjunction with the transceiver, receive accelerometer signal obtained via an external wireless device, such as a cellular phone.

The transceiver transmits and receives information via one or more antennae to exchange information with one or more other wireless devices. According to aspects, the transceiver includes one or more microphones. The one or more microphones are configured to detect noise, such as wind noise.

The audio output transducer may be also known as a driver or speaker. In some examples, more than one output transducer is used. The transducer converts electrical signals into sound and converts sound into electrical signals. The transducer is configured to output the audio signals having an automatically adjusted SPL.

As observed with in-ear microphone measurements and shown in FIG. 1, more energy is measure in an occluded ear at lower frequencies as compared to higher frequencies. Additionally, noise in the ear canal increases as a user's feet strike the ground more quickly. As described herein, an accelerometer signal is used as a proxy for estimating noise in the canal to automatically adjust the any combination of the overall volume or tone of the audio signal to compensate for in-ear noise. Due to an increased noise at higher frequencies, the audio device may adjust bass frequencies more in the bass bands as compared to other frequency bands. In addition to bass band adjustment, the overall signal may be boosted as well. The amount of bass band boost may be different than the overall audio signal boost to compensate for more noise in-eat at lower frequencies.

Absent the techniques described herein, a user would need to adjust the volume of the audio output. The automatic SPL adjustment provides a comfortable, more-seamless listening experience despite changes in the user's in-ear noise. Thus, a user may listen to audio output that is automatically adjusted to accommodate the user's speed. Further, the user may not recognize any changes in the SPL of the audio signal output by the audio device.

In the preceding, reference is made to aspects presented in this disclosure. However, the scope of the present disclosure is not limited to specific described aspects. Aspects of the present disclosure may take the form of an entirely hardware embodiment, an entirely software embodiment (including firmware, resident software, micro-code, etc.) or an embodiment combining software and hardware aspects that may all generally be referred to herein as a "component," "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams may represent a module, segment or portion of code, which comprises one or more executable instructions for implementing the specified logical function(s). In some implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The invention claimed is:

1. A method performed by a wearable audio device comprising:
   outputting an audio signal;
   measuring, by an accelerometer, motion in an ear canal of a user of the audio device;
   automatically adjusting a sound pressure level (SPL) of audio signal based, at least in part on the measured motion; and
   outputting the adjusted audio signal.

2. The method of claim 1, wherein automatically adjusting the SPL of the audio signal comprises:
   adjusting the SPL across all frequency bands of the audio signal by a same amount.

3. The method of claim 1, wherein automatically adjusting the SPL of the audio signal comprises:
   adjusting the SPL for at least one frequency band by a first amount.

4. The method of claim 3, wherein automatically adjusting the SPL of the audio signal further comprises:
   adjusting the SPL across all frequency bands of the audio signal by a second amount.

5. The method of claim 1, further comprising:
   processing a first frequency band of the audio signal occupying a lower frequency portion of the audio signal and processing all frequency bands of the audio signal including the first frequency band,
   wherein automatically adjusting the SPL comprises adjusting the SPL more for the first frequency band as compared to all frequency bands of the audio signal.

6. The method of claim 5, wherein automatically adjusting the SPL further comprises:
   adjusting the SPL across all frequencies of the first frequency band and the audio signal.

7. The method of claim 5, wherein the first frequency band comprises frequencies less than or equal to 100 Hertz.

8. The method of claim 1, wherein automatically adjusting the SPL comprises one of increasing or decreasing the SPL of the audio signal.

9. A wearable audio device comprising:
   a speaker configured to output an audio signal;
   an accelerometer configured to measure motion in an ear canal of a user of the audio device; and
   a processor configured to automatically adjust a sound pressure level (SPL) of audio signal based, at least in part on the measured motion,
   wherein the speaker is configured to output the adjusted audio signal.

10. The wearable audio device of claim 9, further comprising:
    circuitry configured to separate the audio signal into a first frequency band and a second frequency band, wherein the first frequency band occupies lower frequency portions of the audio signal as compared to the second frequency band,
    wherein the processor is configured to adjust a tone of the audio signal by adjusting an SPL of the first frequency band more than an SPL of the second frequency band.

11. The wearable audio device of claim 10, wherein the processor is further configured to:
    adjust the SPL across all frequencies of the audio signal.

12. The wearable audio device of claim 9, wherein the processor is configured to automatically adjust the SPL of the audio signal by:
    adjusting the SPL across all frequency bands of the audio signal by a same amount.

13. The wearable audio device of claim 12, wherein the adjusting comprises:
    increasing the SPL across all frequency bands of the audio signal.

14. The wearable audio device of claim 9, wherein measuring the motion in the ear canal provides an estimate of the sound as a function of frequency when the wearable audio device is placed in the ear canal of the user.

15. The wearable audio device of claim 14, further comprising:
    a microphone configured to detect sound occupying different frequency bands than the estimate of the sound as the function of frequency,
    wherein the processor is configured to automatically adjust the SPL of the audio signal based, at least in part on the measured motion and the sound detected by the microphone.

16. The wearable audio device of claim 9, further comprising a flexible outer surface configured to contact and create a gentle seal with the ear canal of the user.

17. A method performed by a wearable audio device comprising:
    outputting an audio signal having a first sound pressure level (SPL);
    measuring, by an accelerometer, motion in an ear canal of a user of the audio device;
    automatically increasing the SPL of the audio signal based, at least in part on the measured motion to generate an audio signal having a second SPL;
    outputting the audio signal having the second SPL;
    measuring, by the accelerometer, a decrease in the motion in the ear canal of the user;
    automatically decreasing the SPL of the audio signal having the second SPL based, at least in part, on the decrease in the motion in the ear canal to generate an audio signal having a third SPL; and
    outputting the audio signal having the third SPL.

18. The method of claim 17, wherein the motion in the ear canal varies based, at least in part, on a rate at which a user's feet contact the ground.

19. The method of claim 17, wherein automatically increasing the first SPL of the audio signal based, at least in part on the measured motion to generate the audio signal having the second SPL comprises:
    increasing the first SPL for at least one frequency band by a first amount; and
    increasing the first SPL across all frequency bands of the audio signal by a second amount.

20. The method of claim 17, wherein automatically increasing the SPL of the audio signal comprises:
    increasing the SPL across all frequency bands of the audio signal by a same amount.

21. The method of claim 17, wherein automatically increasing the SPL of the audio signal comprises:
    increasing the SPL based on a frequency band of the audio signal.

* * * * *